United States Patent [19]
Bell

[11] Patent Number: 5,444,992
[45] Date of Patent: Aug. 29, 1995

[54] PORTABLE TWO LITER SODA BOTTLE FOUNTAIN/COOLER

[76] Inventor: Gary L. Bell, 407 Hershey Dr., Hopkinsville, Ky. 42240

[21] Appl. No.: 112,307

[22] Filed: Aug. 27, 1993

[51] Int. Cl.⁶ ............................................. F25D 3/08
[52] U.S. Cl. ...................................... 62/372; 62/400; 62/457.3; 62/457.8; 62/530; 222/146.6
[58] Field of Search ................... 62/371, 372, 389, 400, 62/398, 393, 457.3, 457.8, 530; 222/129.1, 146.6

[56] References Cited

U.S. PATENT DOCUMENTS

| | | | |
|---|---|---|---|
| 4,164,581 | 8/1979 | Bryant | 62/457.3 |
| 4,338,795 | 7/1982 | House | 62/372 |
| 4,531,381 | 7/1985 | Toro et al. | 62/372 |
| 4,870,837 | 10/1989 | Weins | 62/372 |
| 4,961,324 | 10/1990 | Allan | 62/400 |
| 5,148,682 | 9/1992 | Wolf | 62/457.8 |

FOREIGN PATENT DOCUMENTS
2327746  6/1977  France .

*Primary Examiner*—John M. Sollecito

[57] ABSTRACT

This invention disclosure pertains to a device which is used for cooling soda and food by means of a reusable two piece horizontally positioned iceblock pack which the parts thereof are molded to conform to the shape of a two liter soda bottle. The iceblock pack with bottle and a food holding tray are contained within a thickly insulated rectangular housing. A vented tap is screwed onto the bottle after being enclosed within the case to permit dispensing of the soda. The unit is supported into its tilted angled down position by means of an angular shaped leg apparatus which is also the carrying handle apparatus when rotated around to the top of the cooling unit and snapped onto the spring loaded buttons. The iceblock packs contained within the cooler are to be frozen within a freezing unit before usage.

6 Claims, 9 Drawing Sheets

PORTABLE TWO LITER SODA BOTTLE FOUNTAIN/COOLER

BACKGROUND OF THE INVENTION

The field of the invention relates to a variety of chilling and dispensing units which house a variety of bottles. While these patents in the prior art have advantages, they lack the practicality and ease of assembly and use in contrast to the present invention. Most of those in the prior art will contain and refrigerate a bottle but will only dispense the beverage within by manually lifting or tilting the beverage container and housing. The present invention after being loaded will provide a means of supporting the bottle so the beverage will pour out of an adjustable tap with only the touch of a finger like the soda fountains used in restaurants.

U.S. Pat. No. 5,148,682 to Wolf and U.S. Pat. No. 4,338,795 to House Jr. describe devices and methods for forming ice around bottled beverage containers. While these inventions may provide a means of cooling a bottle, they lack a way of being easily transported and probably will not maintain a cool temperature for extended periods of time. They also appear to be difficult to prepare and assemble.

U.S. Pat. No. 4,961,324 to Allan describes a refrigerant container which holds and dispenses bottled beverages in an upright manner through a threaded conduit affixed through the lid which is screwed onto the bottle and the insulated container. While this invention is somewhat conventional, it still does not provide an easy way to dispense beverages and it appears there may be problems associate with screwing the lid onto the bottle and the insulated container at the same time.

U.S. Pat. No. 4,870,837 to Weins describes an insulated vessel having a high heat capacity sidewall with heat conducting fins containing a liquid with a preferred melting point to maintain a certain cool temperature on a bottle of wine. The container is provided with an absorbent layer which wipes moisture off of the bottle when the bottle is removed. This unit seems to be of a good design but fails to provide a good way to transport and dispense the bottled beverage as in the other patents described.

U.S. Pat. No. 4,531,381 to Toro and Valle describes a cooling assembly that will maintain a chilled temperature on a bottled wine or other beverage. While this invention does provide a means of transporting the beverage and other objects associated, it appears to be somewhat awkward. This invention also appears to be costly and difficult to manufacture.

U.S. Pat. No. 4,164,851 to Bryant describes a motorized unit that will rapidly cool a canned or bottled beverage by spinning the beverage container in ice creating a frictional contact with between the container and the ice within the cooling compartment. This unit appears as if it would be functional but it must have an external voltage supply to power the motor within. This would not be convenient if it were desired to use the device in a remote location. Therefore this greatly limits any portability desired.

French Pat. No. 2,327,746 describes a bottle chilling apparatus that comprises of a champagne bucket mounted on a base that will allow the bucket with the bottle within to be swiveled downward to pour champagne into a glass that is set on the base of the unit. This unit would be practical for home use but as the other units mentioned above, it lacks an easy way of being transported to remote locations.

German Pat. No. 222,983 describes a spherically shaped unit that will house and cool a bottled beverage. This invention will probably perform well but it has a somewhat unpleasant design about it. It also lacks a way of dispensing the beverage without having to lift the entire unit up.

While the prior art described above present good methods for chilling bottled or canned beverages, most do not seem to contain any practical ways of carrying beverages to locations where transportability is a must. The units mentioned above that are somewhat portable are too complicated to assemble or too costly to manufacture. The present invention hereof eliminates any of these prior problems.

BRIEF SUMMARY

Herein described is a convenient new invention that will hold and cool a two liter soda bottle and dispense it at the touch of a finger. It is not only economical in its construction and the type of beverage container used within, it is also much easier to load and use than any other cooler presently on the market. One of the features of this new cooler is a leg base that doubles as a carrying handle. When the cooler is set down on its leg base, the front end automatically swivels downward to allow the bottle to be positioned to dispense its contents so the user will not have to lift to pour the bottle. This position allows for nearly complete extraction of the soda from the bottle. An empty two liter bottle could be filled with the user's favorite drink such as koolaid, water, or tea in case the user does not like soda. The beverage will remain cool for several hours since the two liter bottle is almost completely surrounded by the reusable iceblock packs molded to the shape of the bottle which is all surrounded by a thickly insulated case. After the icepacks and the bottle are inserted into the cooler, an utility tray for storing food and cups is inserted. The icepacks will also keep the food within the tray maintained at a cool temperature for several hours. This new unit also features a screw on tap that has a vent hole in its top to create an air flow path so that the soda will not have to escape a vacuum in order to dispense. The elimination of this vacuum not only greatly improves dispensing, it also prevents the plastic soda bottle from collapsing.

DESCRIPTION OF THE PREFERRED EMBODIMENTS

Figure 1:
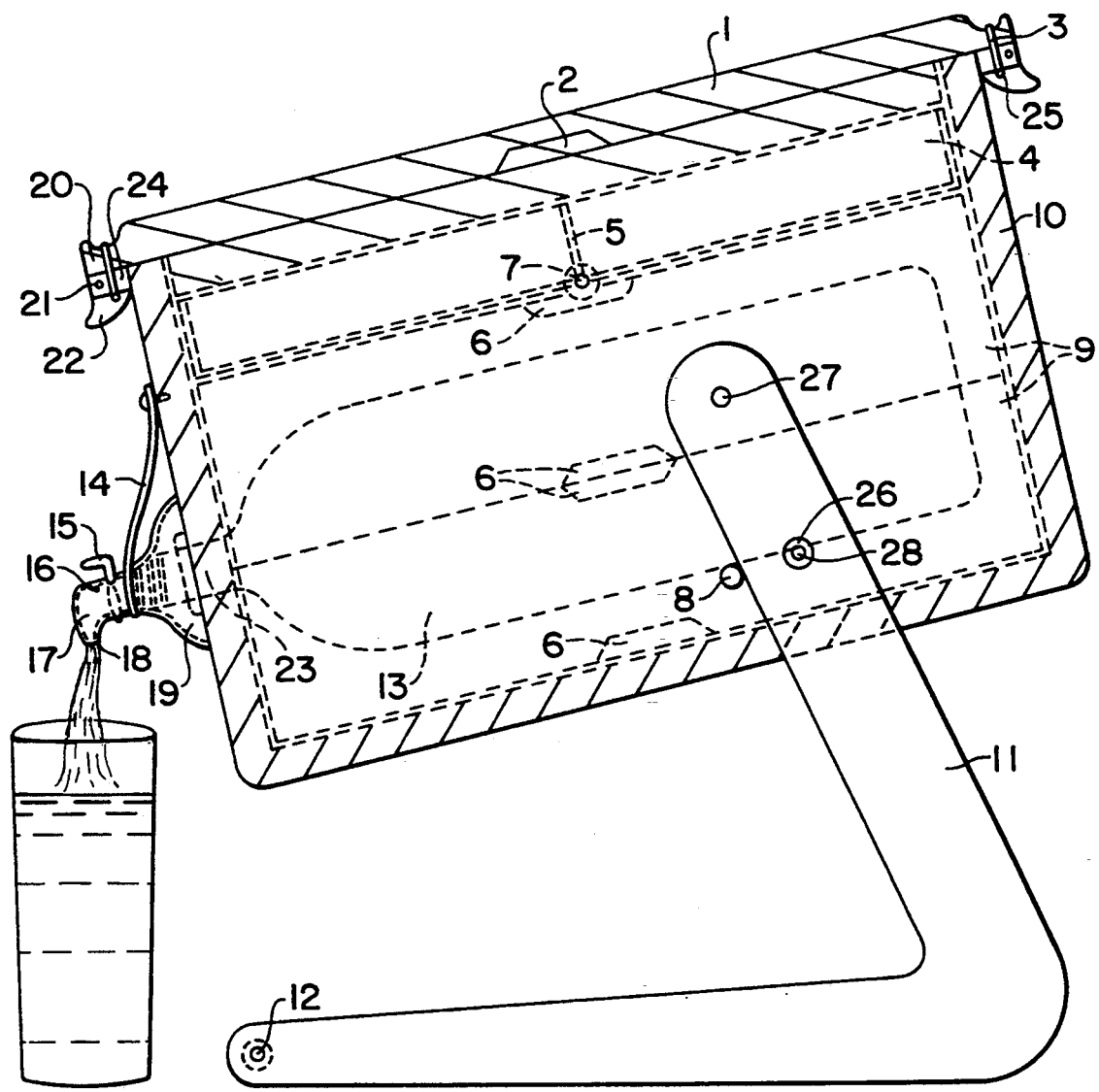
FIG. 1 provides a sectional side view of the cooling unit.
Figure 2:
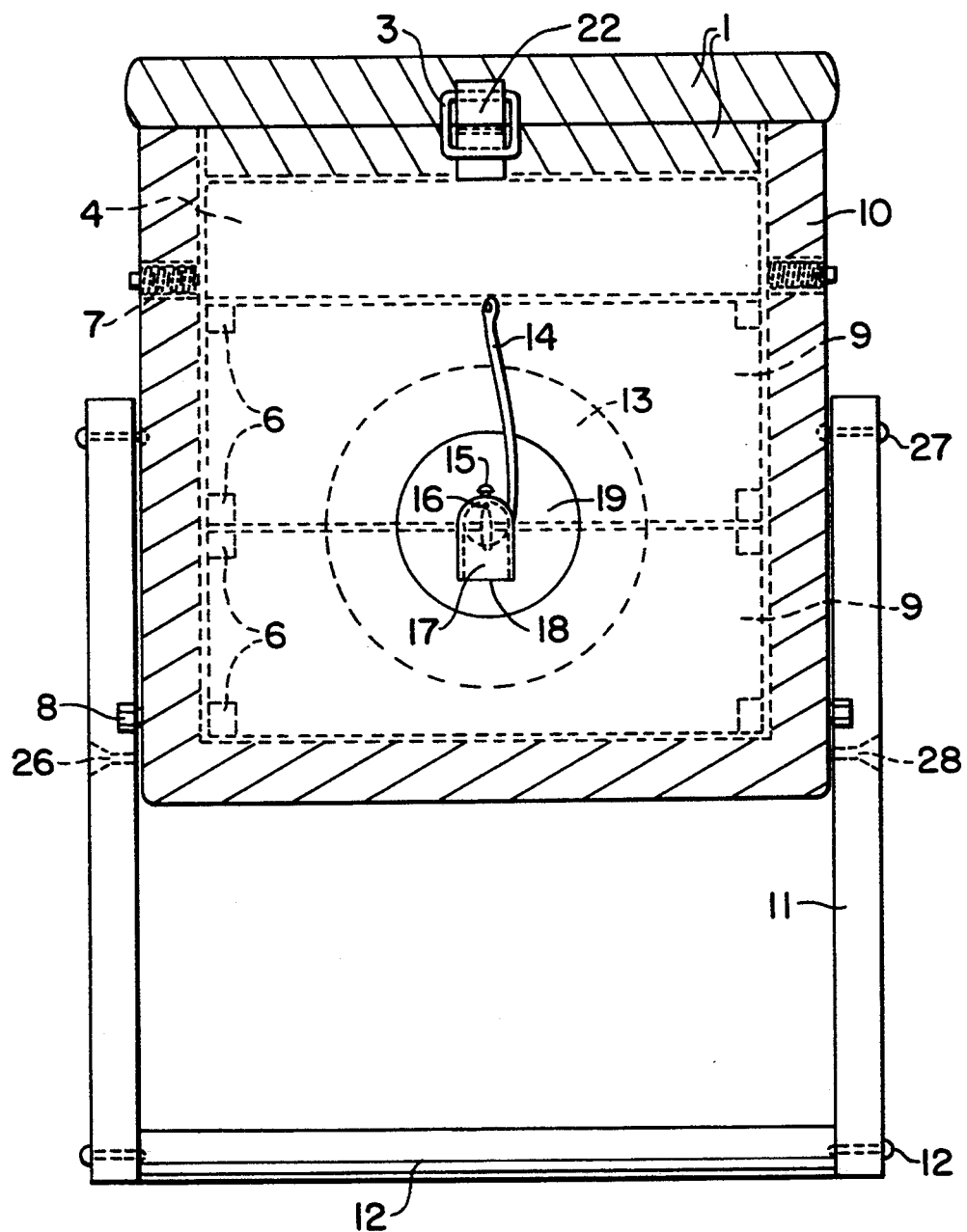
FIG. 2 provides a front three-dimensional view of the cooling unit.
Figure 3:
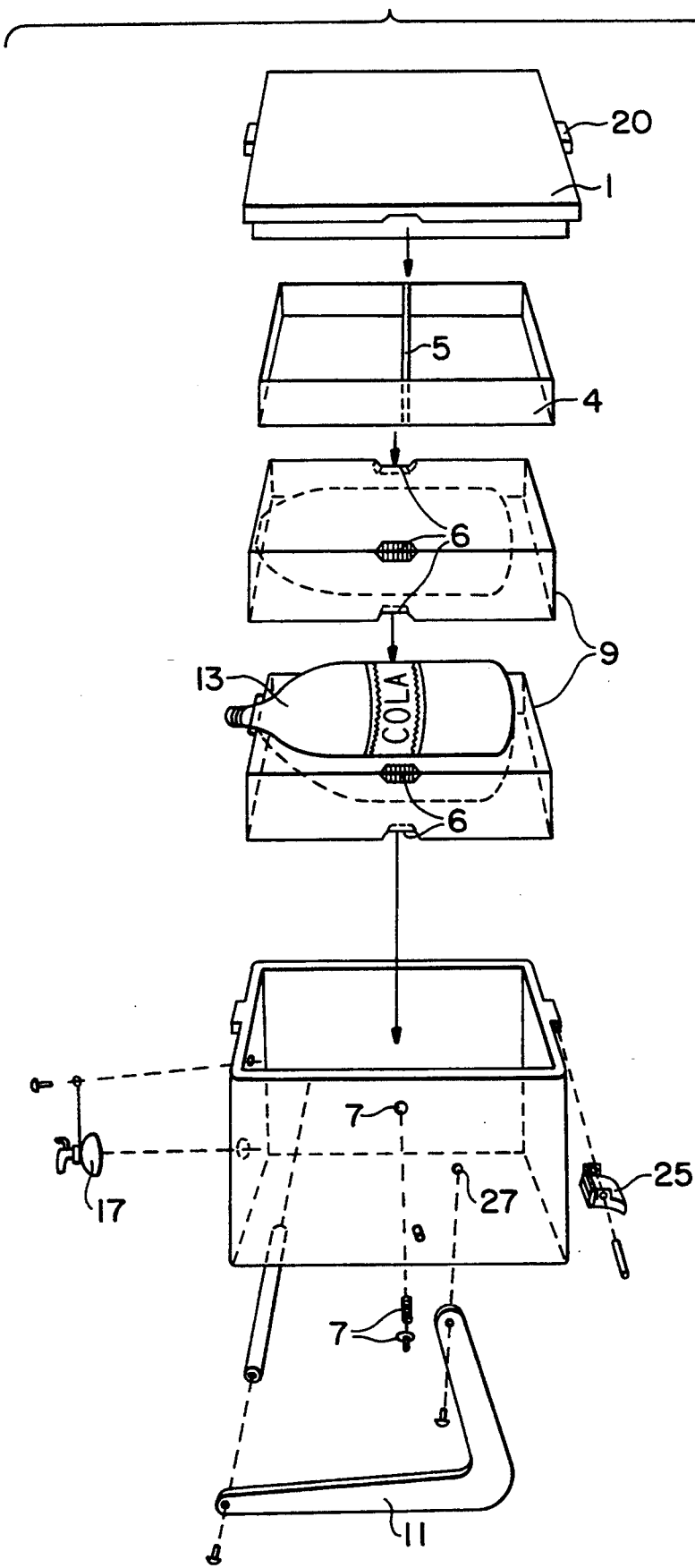
FIG. 3 provides an exploded view of all the parts used thereof.
Figure 4:
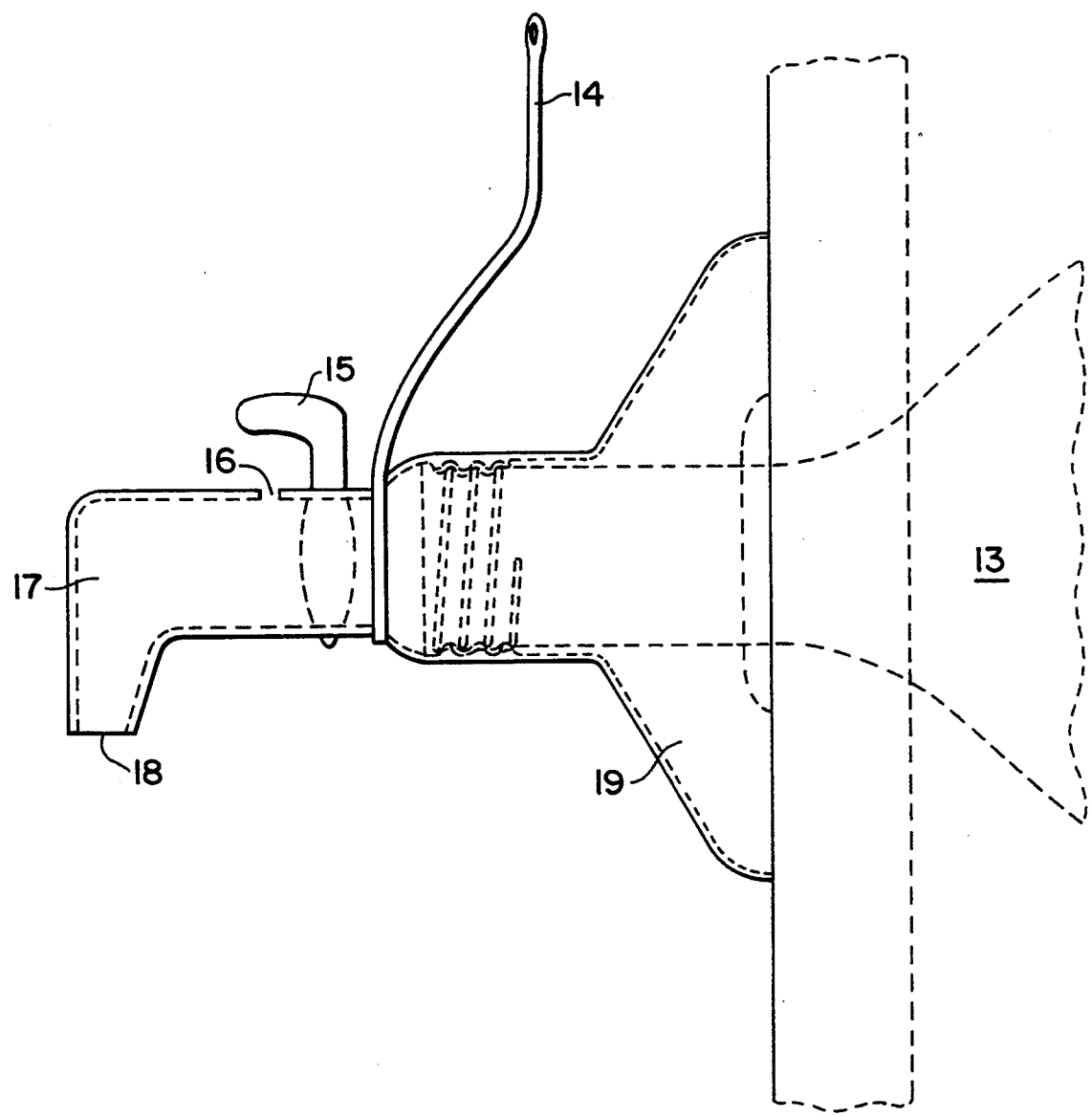
FIG. 4 provides a schematical diagram of the screw-on vented tap valve.
Figure 5:
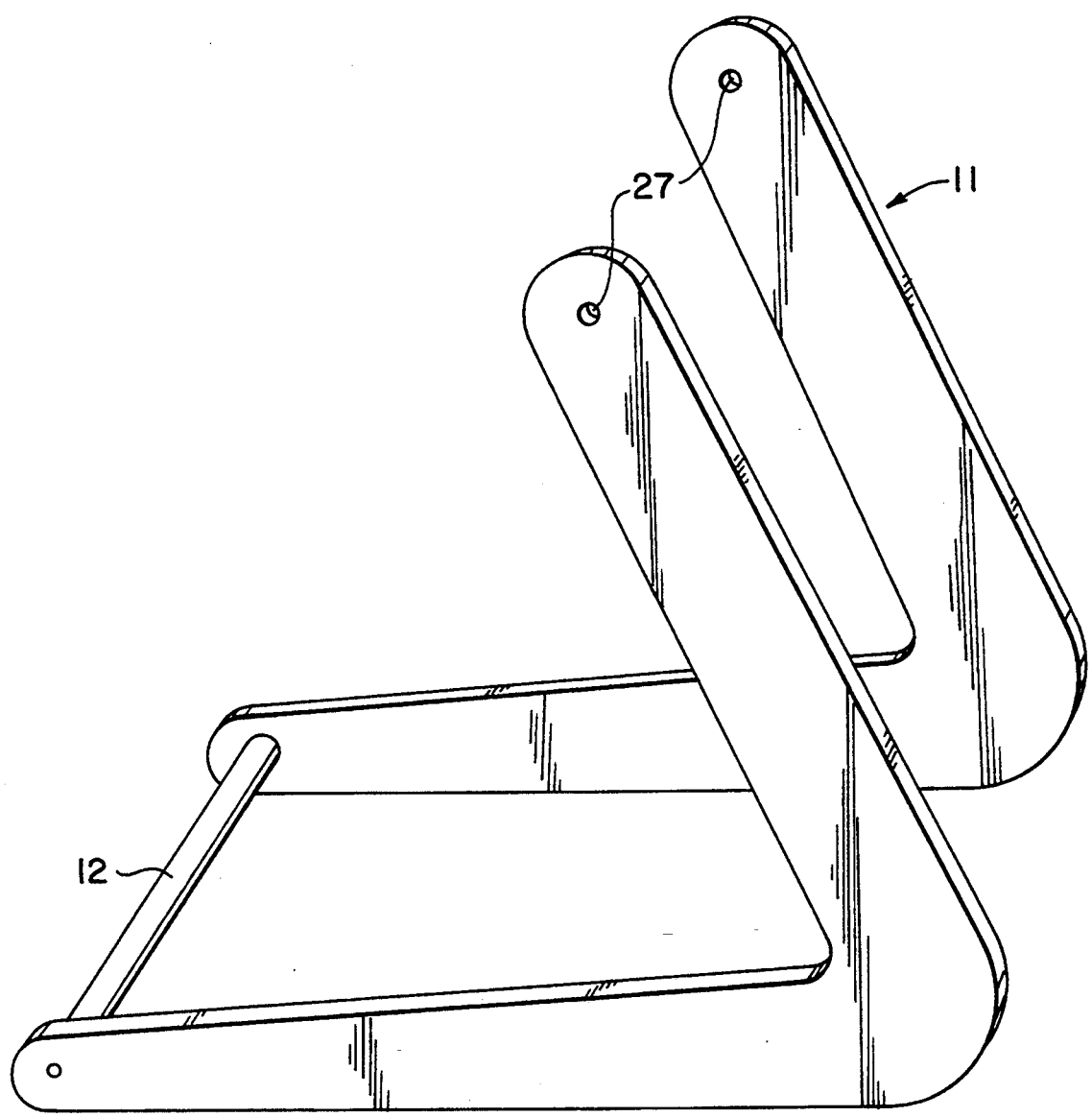
FIG. 5 provides a three-dimensional side view of the leg/handle apparatus.
Figure 6:
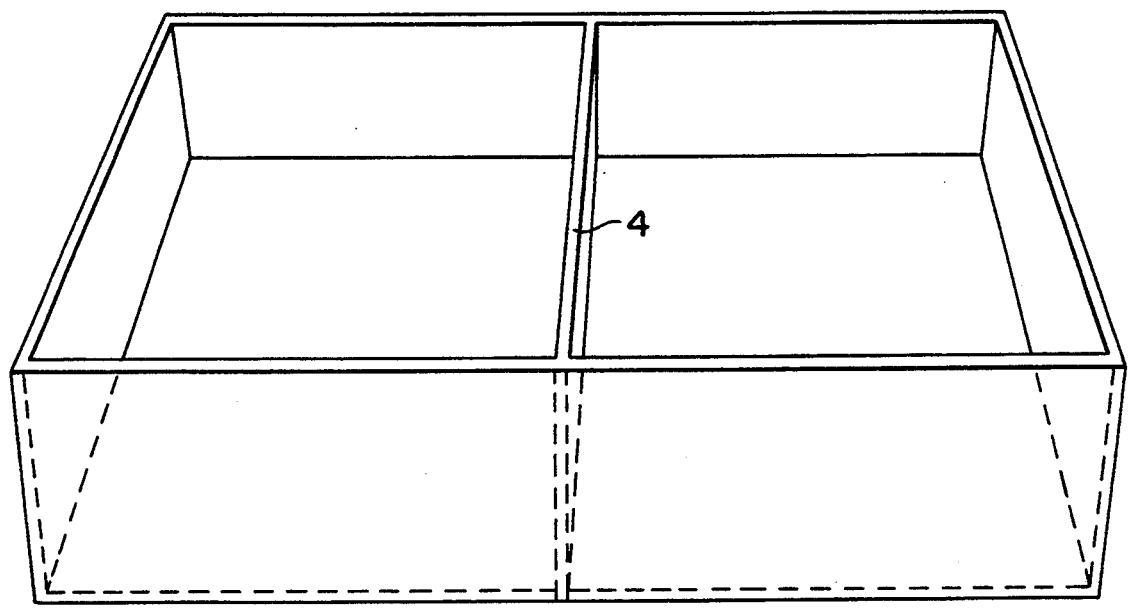
FIG. 6 provides a three-dimensional side view of the utility tray.
Figure 7:
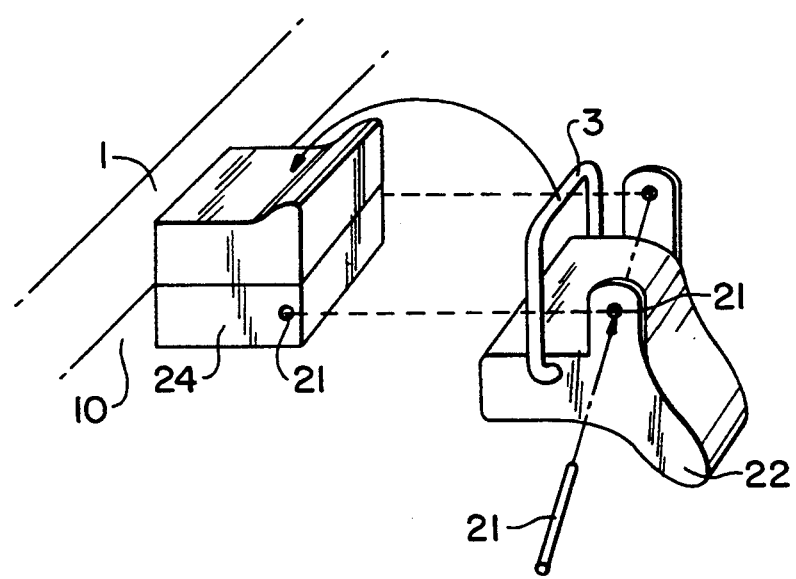
FIG. 7 provides a three-dimensional side view of the right lid clip.
Figure 8:
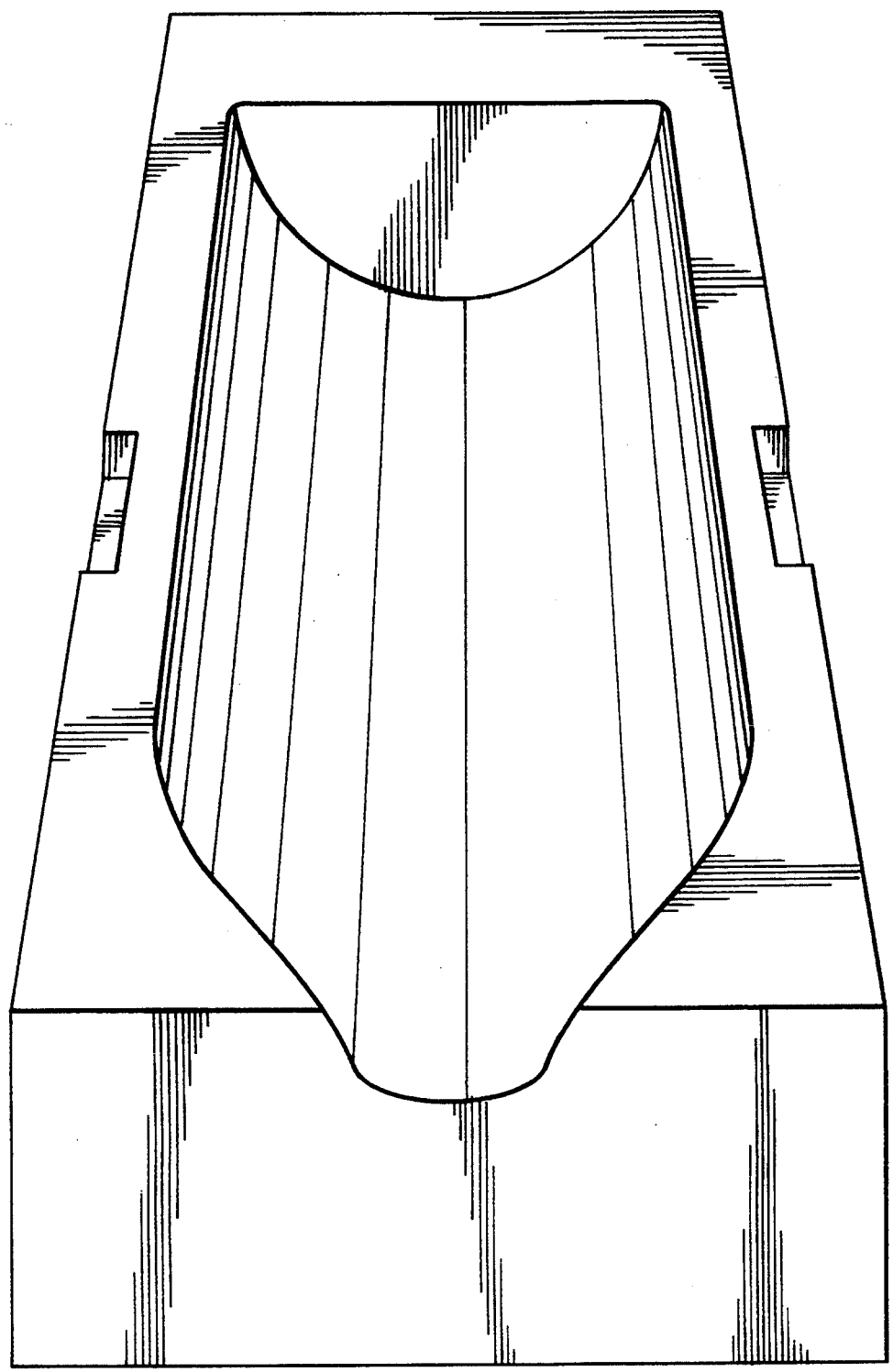
FIG. 8 provides a three-dimensional front view of either one of the iceblock packs.
Figure 9:
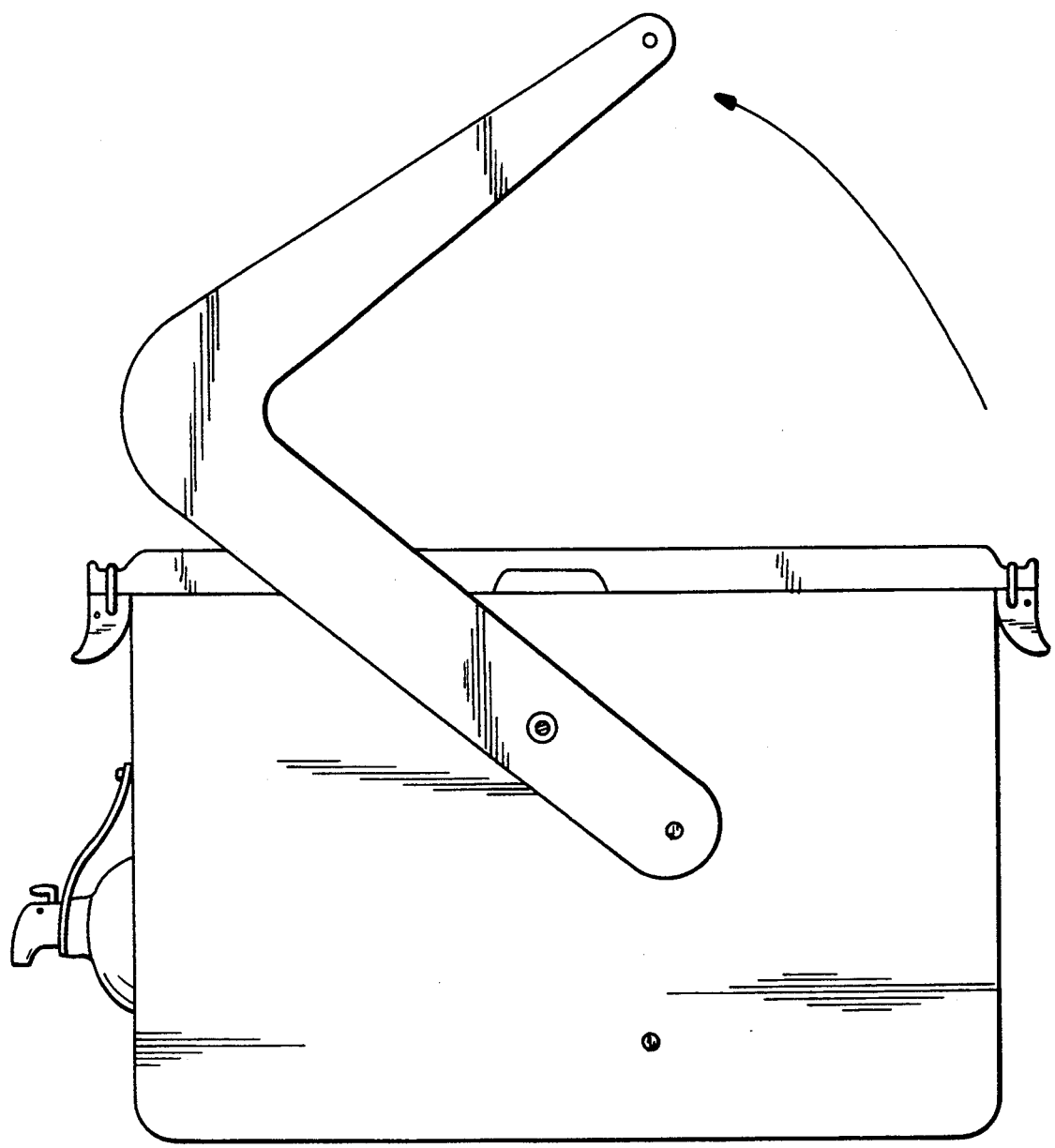
FIG. 9 provides an external side view of the cooler when the leg/handle apparatus is being used as a carrying handle.
Figure 10:
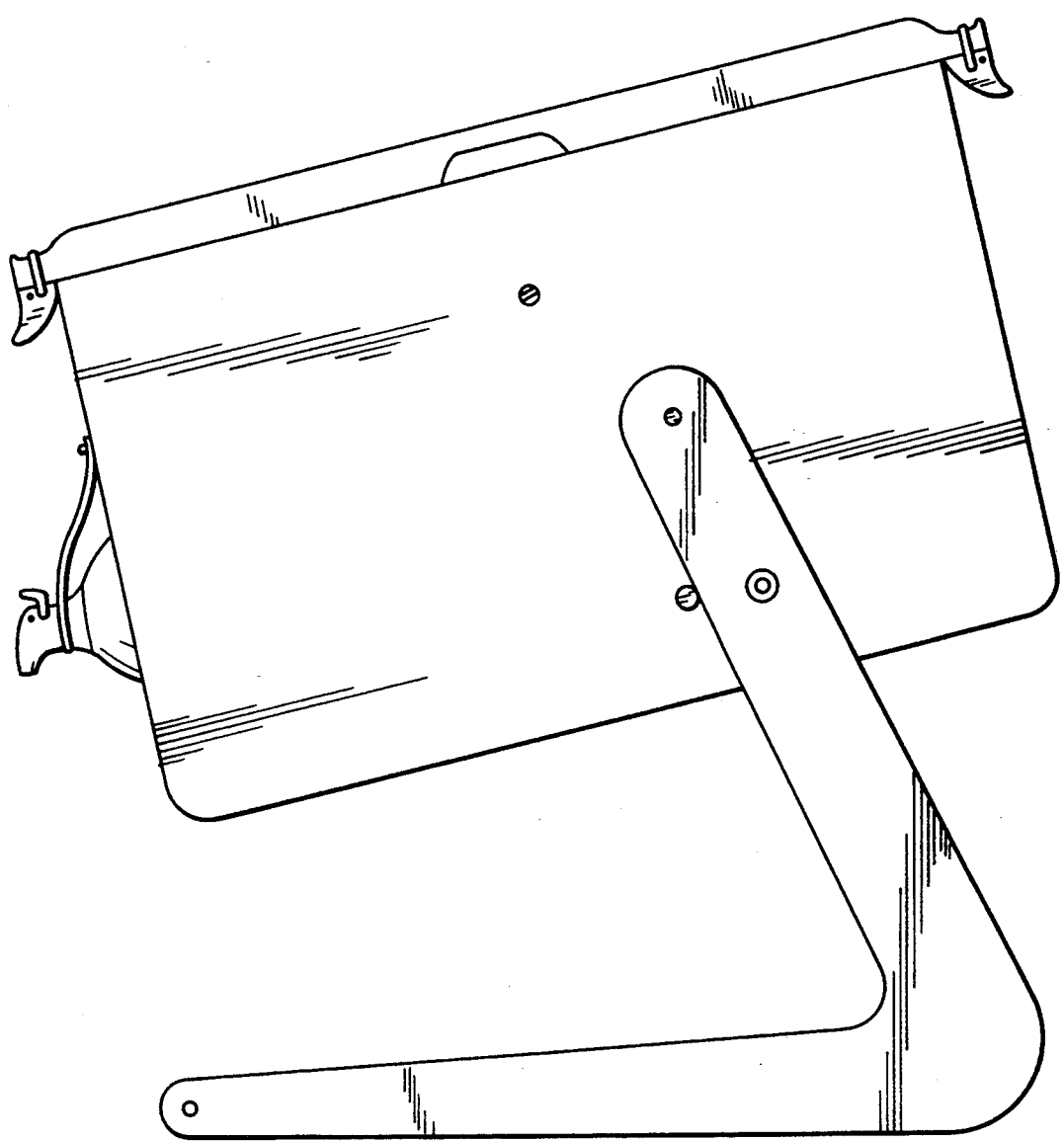
FIG. 10 provides an external side view of the cooler when the leg/handle apparatus is being used as a leg base.

The case 10 is comprised of a rectangular shaped enclosure having two insulated side walls, insulated front and rear walls, and an insulated bottom wall, with each wall comprised of a premolded inner and outer wall which must be filled with an effective insulating material. The case has a large hole 23 molded through the front wall at the appropriate height to permit insertion of the upper end of a 2 liter bottle. This hole must have plastic molded around the inside of it to prevent displacement of the insulating material. The 2 liter bottle 13 is surrounded by two identical soft plastic ice block packs 9 which are permanently filled with a re-freezable liquid. The ice packs are molded flat on one side and molded to contain one half of a horizontally positioned 2 liter bottle within the opposite side. The outside walls of the ice packs are molded to conform to the inside wall of the cooler case. The ice packs have indentions 6 molded into both sides of the top and bottom so that the ice packs can easily be gripped and removed from the cooler. A molded plastic utility tray 4 is used for storing food and cups as well as for holding the ice pack/bottle assembly into place. The utility tray has a center divider 5 molded into it for sorting goods and for assisting in lifting the tray out of the cooler. The cover lid 1 is designed with a narrow bottom that will fit firmly into the inside wall of the cooler. The cover lid has an indention 2 in each side for hand gripping. The cover lid must be filled with insulating material comparative with that of the case. The lid has a small projection 20 at the center bottom of each side (top section of the lid) that is used for snapping the metal ring 3 of the plastic lid clip down in order to secure the lid to the case. The case also has a small projection 24 on each side positioned directly under each of the lid's projections 20. This projection is used for holding the plastic lid clip to the case by means of a straight metal pin which is inserted through the holes 21 of the projection and the plastic lid clip. The molded plastic tap 17 is comprised of a turn valve 15, a small hole 16 at the top of the tap to allow air flow, a larger hole 18 to allow release of liquids, a screw cap and insulating boot 19 molded from a soft plastic or a soft plastic/rubber combination to allow the 2 liter bottle to be sealed and also to serve the purpose of insulating the large hole 23. A plastic strap 14 is installed from the tap to the case to prevent the tap from being lost. A pair of v-shaped leg/handle sections each comprised of first and second straight section joined at one end to form a V, with the remaining ends joined together by a rod 12 thereby forming a v-shaped leg/handle 11, with each of the other ends of the respective v-shaped leg/handle sections being attached to the side walls. The leg/handle 11 is attached loosely to the side walls of the cooler by rivets 27. These rivets must be mounted to the vertical center of the cooler horizontally offset to the rear of the center of the side walls such that the v-shaped leg/handle pivots about an axis defined by the side wall attachment points 27 (as seen in FIG. 9) and is biased so that the front end of the rectangular shaped enclosure is compelled by gravity to lean downward when the first straight sections of the v-shaped leg/handle are disposed in a horizontal position below the rectangular shaped enclosure, thereby defining a leg stand position (as seen in FIG. 1 and 10). After the tap end leans downward, the cooler catches onto the leg/handle by means of a solid button projection 8 on each side of the cooler. The cooler will lean downward to at least a 15 degree angle to permit continuous flow of the beverage through the tap. The ends of both v-shaped leg handle sections are joined together by means of a plastic rod 12 which is to be used as a carrying handle. This rod can either be joined to the leg handles by rivets or screws or it can be permanently molded as part of the leg/handle assembly The leg/handle can be used as a carrying handle (as seen in FIG. 9) by swinging the leg/handle towards the rear of the unit rotating it about the axis defined by the side wall attachment points (27) then over the unit to the carrying handle position. Spring buttons 7 are pressed inward while sliding leg handle over these buttons until these buttons snap out into holes 10 of the leg/handle on both sides. Hole 10 of the leg/handle has an indention around it 26 so that the spring buttons 7 can be pressed completely in to allow leg/handle to be rotated back to the leg stand position (as seen in FIG. 10).

I claim:
1. An insulated beverage dispenser comprised of:
a rectangular shaped enclosure having two insulated side walls, insulated front and rear walls, an insulated bottom wall, and an insulated cover lid, with said front wall defining a front end of said enclosure and said rear wall defining a rear end of said enclosure;

a pair of v-shaped leg/handle sections each comprised of first and second straight section joined at one end to form a V, with the remaining ends of said straight sections defining respective first and second ends, said first ends of said respective v-shaped leg/handle sections are joined together by a rod thereby forming a v-shaped leg/handle, with each of the other ends of said respective v-shaped leg/handle sections being attached to one of said side walls at a respective point which is vertically in the center and horizontally offset to the rear of the center of said respective side walls such that said v-shaped leg/handle pivots about an axis defined by said side wall attachment points and is biased so that said front end of said rectangular shaped enclosure is compelled by gravity to lean downward when the said first straight sections of said v-shaped leg/handle are disposed in a horizontal position below said rectangular shaped enclosure, thereby defining a leg stand position;

projections located on each of said respective wall located below said side wall attachment points defining means to hold the enclosure in place at a downward angle when said v-shaped leg/handle is disposed in said leg stand position;

spring buttons located above said side wall attachment points defining means to allow said v-shaped leg/handle to be locked in place with said first straight sections of said v-shaped leg/handle disposed in a position substantially above said rectangular shaped enclosure, thereby defining a carrying handle position;

whereby said v-shaped leg/handle may be rotated about said axis defined by said side wall attachment points to either said leg stand position or said carrying handle position;

a pair of identical ice packs filled with a refreezable liquid, said blocks when held together have common outer dimensions that conform to inner dimensions of said rectangular shaped enclosure and form an inner cavity shaped to receive a beverage container, so that the beverage container is in close heat transfer contact with the ice packs and said ice packs are snugly received in said rectangular shaped enclosure;

a hole in said front wall of said rectangular shaped enclosure positioned so that a neck of said beverage container will project through said hole when said ice packs and said beverage container received therein are received in said rectangular shaped enclosure;

whereby a beverage stored in said beverage container may be chilled in said rectangular shaped enclosure, said projections, said side wall attachment points and said v-shaped leg/handle, when in said leg/stand position, define means to hold said rectangular shaped enclosure and said beverage container at a downward angle to dispense said beverage from said beverage container; and said v-shaped leg/handle, when in said carrying handle position define means to hand carry said insulated beverage dispenser by grasping said rod.

2. A insulated beverage dispenser as claimed in claim 1 further comprising a hole located in each of said second straight sections of said v-shaped leg/handle sections to respectively receive each of said spring buttons and hold said v-shaped leg/handles in said carrying handle position.

3. A insulated beverage dispenser as claimed in claim 1 further comprising a set of four indentions located in each of said ice packs to enable easy removal of said ice packs from said rectangular shaped enclosure.

4. A insulated beverage dispenser as claimed in claim 1 further comprising a spigot provided with means to enable attachment to said neck of said beverage container and thereby control dispensing of said beverage.

5. A insulated beverage dispenser as claimed in claim 4 further comprising an insulating boot surrounding the neck of said beverage container to seal and insulate the hole.

6. A insulated beverage dispenser as claimed in claim 1 further comprising a molded plastic utility tray received in said rectangular shaped enclosure for storing goods and holding the ice packs in position.

* * * * *